United States Patent [19]
Basstein

[11] Patent Number: 6,041,670
[45] Date of Patent: Mar. 28, 2000

[54] GEAR TRANSMISSION

[75] Inventor: Augustinus F. H. Basstein, Delden, Netherlands

[73] Assignee: Crown Gear B.V., Netherlands

[21] Appl. No.: 09/096,864

[22] Filed: Jun. 12, 1998

Related U.S. Application Data

[63] Continuation of application No. PCT/NL96/00485, Dec. 12, 1996.

[30] Foreign Application Priority Data

Dec. 14, 1995 [NL] Netherlands ............................ 1001902

[51] Int. Cl.[7] ...................................................... F16H 1/22
[52] U.S. Cl. .................................. 74/416; 74/410; 74/396
[58] Field of Search ......................... 74/416, 410, 665 F, 74/665 G, 395, 396

[56] References Cited

U.S. PATENT DOCUMENTS

| | | | |
|---|---|---|---|
| 1,040,443 | 10/1912 | Signor | 74/410 |
| 1,514,522 | 11/1924 | Hilmes | 74/410 |
| 3,368,420 | 2/1968 | Alexander, Jr. | 74/410 |
| 3,374,687 | 3/1968 | Vogt | 74/417 |
| 3,727,574 | 4/1973 | Bagge | 74/410 |
| 4,266,436 | 5/1981 | Reppert | 74/410 |
| 4,297,907 | 11/1981 | Bossler, Jr. et al. | 74/410 |
| 5,509,862 | 4/1996 | Sherman | 74/665 F |

FOREIGN PATENT DOCUMENTS

| | | |
|---|---|---|
| 1512420 | 4/1968 | France . |
| WO 95/16151 | 6/1995 | WIPO . |

OTHER PUBLICATIONS

Merritt, H.E., "Gear", Book, 1943, pp. 356–357.

*Primary Examiner*—David A. Bucci
*Assistant Examiner*—William C Joyce
*Attorney, Agent, or Firm*—Deveau & Marquis

[57] ABSTRACT

Gear transmission between an input shaft and an output shaft, comprising a first and second face gear which are rotatable about a first axis of rotation and have identical toothing as regards number of teeth and module, which face gears are mounted at an adjustable distance from each other with the toothing facing each other and with an essentially fixed rotation position relative to each other, comprising a first cylindrical pinion with an axis of rotation at right angles to the first axis of rotation, which first pinion with a first tooth clearance is in mesh with the first face gear, and comprising a second cylindrical pinion whose axis of rotation is parallel to the axis of rotation of the first cylindrical pinion, which second pinion with a second tooth clearance is in mesh with the second face gear while the input or the output shaft is connected to the first pinion. The toothings of the face gears and the pinions in mesh therewith are designed in such a way that after theoretically correct setting of the toothings the first tooth clearance is greater than the second tooth clearance.

10 Claims, 2 Drawing Sheets

GEAR TRANSMISSION

This application is a continuation of international application No. PCT NL/9600485 filed Dec. 12, 1995.

BRIEF SUMMARY OF THE INVENTION

The invention relates to a gear transmission between an input shaft and an output shaft, comprising a first and second face gear which are rotatable about a first axis of rotation and have identical toothing as regards number of teeth and module, which face gears are mounted at an adjustable distance from each other with the toothing facing each other and with an essentially fixed rotation position relative to each other, a first cylindrical pinion with an axis of rotation at right angles to the first axis of rotation, which first pinion is in mesh with the first face gear with a first tooth clearance, and a second cylindrical pinion whose axis of rotation is parallel to the axis of rotation of the first cylindrical pinion, which second pinion is in mesh with the second face gear with a second tooth clearance, while the input or the output shaft being connected to the first pinion.

Such a transmission is known from WO95/16151, which discloses a drive in which the first face gear is connected by way of a bush to the second face gear. The face gears are in mesh respectively with the first pinion and the second pinion, which acts as an intermediate pinion. The first pinion is driven by a hydraulic motor. In the case of the known device it is assumed that the tooth clearances occurring are taken up by making the bush elastic. In the case of the known device the elasticity of the bush is suitable only for making the face gears rotate through a limited angle relative to each other. The result of this is that when the direction of rotation is changed one face gear will be under a much greater load than the other face gear, because different tooth clearances exist between the driven pinion and the face gears. This means that the tooth clearances are virtually impossible to take up for both directions of rotation. The bush is set for one direction of rotation and on reversal of the direction of rotation only one face gears meshes with the pinion, and the other face gears retains clearance. This means that the moment to be transmitted by the device is different for the two directions of rotation, which is undesirable for a large number of applications.

The object of the invention is to produce an improvement in this respect, and to this end the toothings of the face gears and the pinions in mesh therewith are designed in such a way that, after theoretically correct setting of the toothings, the first tooth clearance is greater than the second tooth clearance.

The fact that the first tooth clearance between the first pinion connected to the input or output shaft and the first face gear in mesh therewith is made greater than the second tooth clearance between the second pinion and the second face gear means that in the usual case where a third tooth clearance is present between the first and the second pinions, which is necessary for good functioning of the transmission, it becomes possible for both face gears to rest against the pinions in mesh therewith in both directions of rotation.

A further improvement is achieved by making the first tooth clearance equal to the sum of the second and the third tooth clearance.

In this way it is ensured that, when the direction of rotation of the first pinion is reversed, the first clearance between first pinion and first face gear is traversed and at the same time the second tooth clearance and the third tooth clearance are traversed, so that both face gears simultaneously mesh again and change direction of rotation.

A further improvement is achieved by making the face gears, which are mounted at an adjustable distance from each other, movable in the direction of their axis of rotation. This ensures that the two forces acting in the direction of the axis of rotation are identical between the two face gears and the pinions in mesh therewith, which also means that the tooth forces are identical and that both wheels are under equal load.

A further improvement is achieved by providing the second pinion with more teeth than the first pinion. Since this is an intermediate pinion, the teeth of the second pinion are more frequently under load than the teeth of the first pinion, with the result that fatigue fracture can occur sooner. The resistance to fatigue is improved by designing the second pinion with a larger diameter.

According to a preferred embodiment, by having the first and/or the second pinion crossed by the first shaft, it becomes possible to reduce the distance between the face gears, with the result that a more compact transmission is possible.

According to a further preferred embodiment of the invention, the toothings of the first pinion and the first face gear in mesh therewith are designed in such a way by selection of number of teeth, pressure angle and tooth correction factor of the first pinion and diameters of the toothing of the face gear that a line of contact between the first face gear and the first pinion runs parallel to a line of contact between the first pinion and the second pinion, the direction of which depends on, inter alia, the number of teeth, the pressure angle, the tooth correction factor and the center-to-center distance of the pinions.

In the event of the lines of contact running parallel, it is possible, if desired, to design the first pinion with bearings which bound the movement of the first pinion solely in its axial direction, and the pinion in the direction at right angles to its axial direction is held in position by the tooth forces running in the direction of the lines of contact.

According to a further preferred embodiment, the face gears are mounted on a face gear shaft, and a third cylindrical pinion is mounted between the face gears on said shaft, which third pinion is in mesh with a gearwheel which is mounted on a shaft parallel to the face gear shaft. A large transmission ratio is achieved in this way. Designing this third pinion with such toothing that the tooth forces do not produce any axial force on the face gear shaft means that a gear transmission in which the bearings of the shafts are not subjected to any tooth forces in the axial direction is produced, with the result that the walls of the gearbox in which the bearings are fixed can be made lighter and costs can be saved. Such toothing can be, for example, a straight toothing or possibly a V-toothing.

BRIEF DESCRIPTION OF THE FIGURES

The invention is explained in the following description of an exemplary embodiment with reference to a drawing, in which.

DETAILED DESCRIPTION OF A PREFERRED EMBODIMENT

In the various figures corresponding parts are always provided with the same reference numbers.

Figure 1:
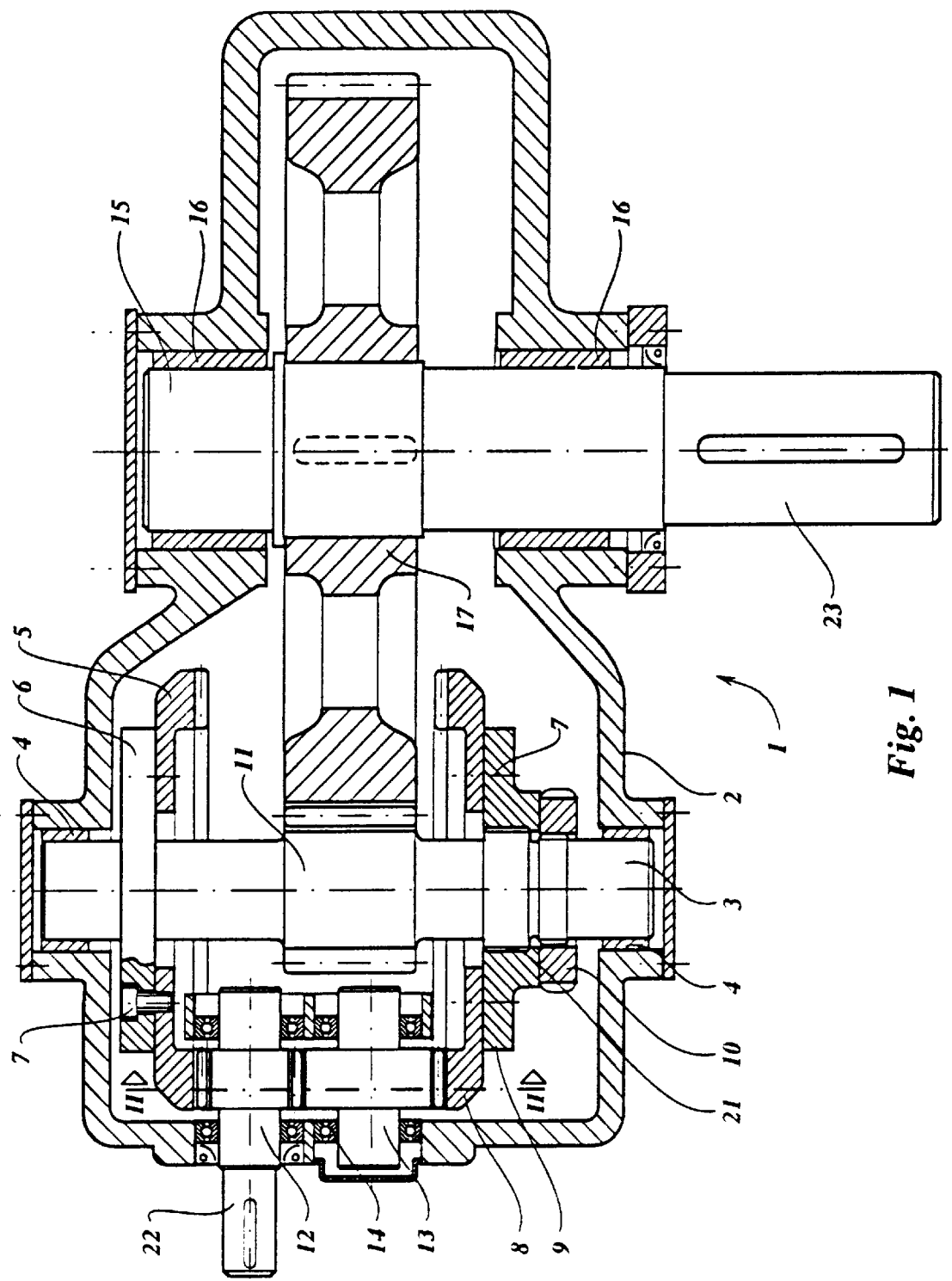
FIG. 1 shows a diagrammatic section of a gearbox with a gear transmission according to the invention.

FIG. 1 shows a gearbox 1 in which a first shaft 3 is rotatably mounted by means of bearings 4 in a housing 2. The first shaft 3 is provided with a shoulder 6, to which a first face gear 5 is attached in a known manner by means of a number of bolts 7. The first shaft 3 is also provided with a multiple key toothing 21, on which a ring 9 is placed in such a way that said ring can slide in the axial direction. The movement of the ring 9 is bounded in the known manner in one direction by a shaft nut 10. A second face gear 8 is attached in a known manner to the ring 9 by means of a number of bolts 7. The toothings of the two face gears 5 and 8 face each other, and are identical as regards number of teeth and module.

A first pinion 12, which is rotatably mounted by means of bearings 14 in the housing 2, is in mesh with the first face gear 5 and with a second pinion 13, which acts as an intermediate pinion, and is likewise rotatably mounted by means of bearings 14 in the housing 2. The axis of rotation of the intermediate pinion 13 is parallel to the axis of rotation of the first pinion 12. Both axes of rotation are situated at right angles to the axis of rotation of the first shaft 3.

In the exemplary embodiment shown in FIG. 1 the number of teeth of the intermediate pinion 13 is greater than the number of teeth of the first pinion 12. However, it is also possible for both pinions to have the same number of teeth, which can lead to some saving. In certain situations it is desirable for the number of teeth of the intermediate pinion 13 to be greater than that of the first pinion 12. The root of the tooth of the intermediate pinion 13 is subjected to a load twice as often as that of the first pinion, with the result that the fatigue strength can be exceeded sooner. The strength of the root of the tooth is improved by using a higher number of teeth for the intermediate pinion 13. The tooth flank of the intermediate pinion 13 is also subjected to a load twice as often as the tooth flank of the first pinion 12 when both directions of rotation occur. If the number of teeth is increased, the strain on the flank is reduced, and the service life is extended.

For a theoretically correct setting of a face gear relative to a pinion which is in mesh therewith, the face gear is moved so much in the direction of its axis of rotation that the face gear rests with its tooth flank over the entire tooth width against the tooth flank of the pinion. There is then line contact. If the distance between the axis of rotation of the pinion and the toothing of the face gear is not correct, no line contact occurs between the two tooth flanks, and only a part of the width of the toothing is utilized. The two toothings are set simultaneously relative to the pinions 12 and 13 by increasing or reducing the distance between the face gears 5 and 8 using the shaft nut 10. Due to the fact that the bearings 4 are in the form of slide bearings, the first shaft 3 can move in the axial direction under the influence of the axially directed tooth forces between the face gears 5 and 8 and the pinions 12 and 13 until these tooth forces are identical.

After the correct setting of the mesh, for a good division of the load over the two face gears 5 and 8 the pinions 12 and 13 must come into contact with the flanks of the two face gears at the same moment. This is achieved by rotating the face gears 5 and 8 in a known manner relative to each other and then fixing them on the shaft 3 in the position in which they are in mesh with the pinions.

The line contact described above can be replaced in a known manner by point contact, which under load passes into line contact, by designing the face gears or pinions with transverse curvature.

A second shaft 15 is rotatably mounted by means of bearings 16 in the housing 2. The second shaft 15 is movable to a limited extent in the axial direction in the bearings 16, which are designed in a known manner as slide bearings. A gearwheel 17 is immovably fixed on the second shaft 15, which gearwheel 17 is in mesh with a third cylindrical pinion 11, which is fitted on the first shaft 3. The toothing of the pinion 11 and the gearwheel 17 is preferably designed in such a way that no axial force is exerted on the first shaft 3 and the second shaft 15. To this end, the toothing can be in the form of straight toothing, or if desired a V-shaped toothing. This ensures that the movement of the first shaft 3 in the axial direction is determined by the tooth forces acting in the opposite direction on the first face gear 5 and the second face gear 8.

The gearbox 1 is provided with an input shaft 22, which forms part of the first pinion 12, and an output shaft 23, which forms part of the second shaft 15. The input shaft 22 and the output shaft 23 can be connected in a known manner to driving and driven machines.

Figure 2:
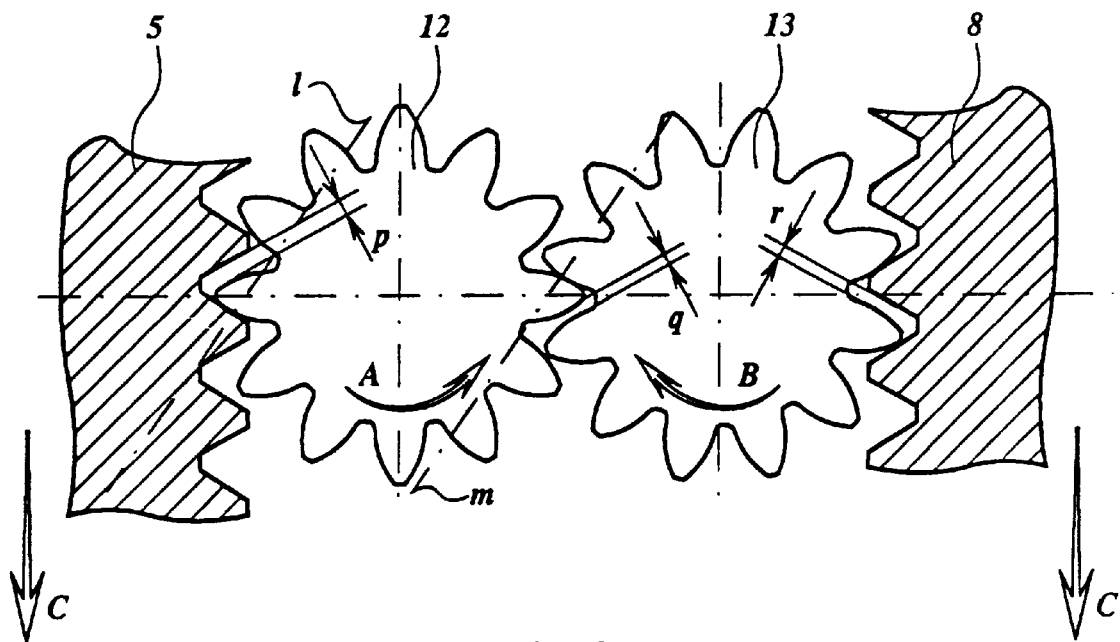
FIG. 2 shows a section corresponding to that along the line II—II in FIG. 1 of a gearbox which is modified slightly compared with FIG. 1.

FIG. 2 shows a section of a gearbox corresponding to the section along the line II—II in FIG. 1, in which the number of teeth of the first pinion 12 and the intermediate pinion 13 is the same. The first pinion 12 is rotated in a direction A, in which case the meshing between the first face gear 5 and the first pinion 12 occurs along a line of contact l and between the first pinion 12 and the intermediate pinion 13 along a line of contact m.

In the situation shown in FIG. 2 the first pinion 12 is in mesh with the first face gear 5, which is moved in a direction of rotation C. A tooth clearance p is present between the non-meshing flanks of first pinion 12 and first face gear 5. The first pinion 12 is also in mesh with the intermediate pinion 13, which rotates in a direction B. A tooth clearance q is present between the non-meshing flanks. The intermediate pinion 13 is also in mesh with the second face gear 8, which likewise rotates in the direction C. A tooth clearance r is present between the non-meshing flanks of intermediate pinion 13 and second face gear 8. The first face gear 5 and the second face gear 8 are mounted on the shaft 3 in the direction of rotation in such a way that, on rotation of the first pinion 12 in the direction A, both face gears mesh simultaneously, as shown in FIG. 2.

If the first pinion 12 starts to rotate in a direction opposite to direction A, the first face gear 5 will start to move in the direction opposite to C after the tooth clearance p has been traversed. The second face gear 8 will start to move in this direction after the tooth clearances q and r have both been traversed. The tooth clearance p is preferably selected in such a way that it is equal to the sum of the tooth clearances q and r. The tooth clearance q can be altered by altering the center-to-center distance between the first pinion 12 and the intermediate pinion 13. Altering the center-to-center distance does not alter the meshing, because the pinions are designed with involute toothing.

The tooth clearances p and r, which occur at theoretically the correct setting of pinion and face gear, cannot be altered by altering the distance between the axis of rotation of, for example, the first pinion 12 and the first face gear 5, because said distance must be set to achieve good contact between pinion and face gear, and because when this distance is altered, the contact between pinion and face gear also alters and the bearing power is undesirably reduced. The tooth clearances p and r which are achieved (at theoretically the correct setting) are consequently entirely dependent on the shape of the toothings which have been established during production. During production, the toothings of a pinion and the face gear meshing therewith are matched to each other, so that with theoretically correct meshing the tooth clearance follows from the shape of pinion and face gear. The shape of the face gear and/or the pinion can be adapted for achieving the desired tooth clearance.

The toothings of the first pinion 12, the intermediate pinion 13 and first face gear 5 in a specific embodiment are selected in such a way that the lines of contact l and m run parallel, which means that the tooth forces on the first pinion 12 run parallel to each other. The direction of this line of contact depends, inter alia, on the selected number of teeth, the pressure angle, the tooth correction factor and the center-to-center distance of the first pinion 12 and the intermediate pinion 13, and on the diameters of the toothing of the first face gear 5. In the case of this known embodiment it is possible to design the first pinion 12 without radial bearings 14, because the pinion is held in position by the tooth forces.

Figure 3:
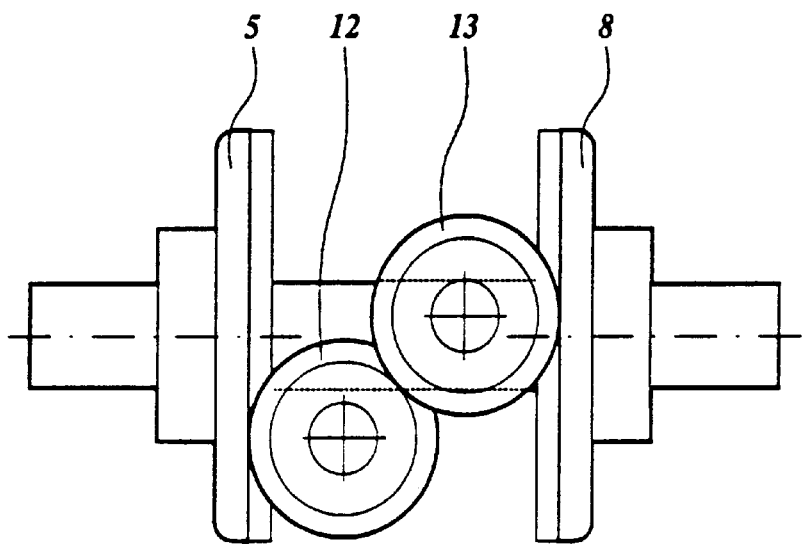
FIG. 3 shows a diagrammatic side view of a gear transmission according to the invention, in which the axes of rotation of the pinions cross the axis of rotation of the face gears.

FIG. 3 shows an embodiment of the gear transmission according to the invention in which the axes of rotation of pinion 12 and/or pinion 13 and the face gears 5 and 8 cross each other. This design makes it possible to bring the face gears 5 and 8 closer together, with the result that a more compact design is possible.

It goes without saying that it is possible for the pinions 12 and 13 and the face gears 5 and 8 to be designed either with oblique or with straight toothing, since this does not have any effect on the principle of the invention. The first pinion 12 will in any case have to be designed with axial bearings if oblique toothing is used.

What is claimed is:

1. Gear transmission between an input shaft and an output shaft, comprising a first and second face gear which are rotatable about a first axis of rotation and have identical number of teeth and module, which face gears are mounted at an adjustable distance from each other with the toothing facing each other and with a fixed rotation position relative to each other and which face gears are together axially displacable, a first cylindrical pinion with an axis of rotation at a right angle to the first axis of rotation, which first pinion is in mesh with the first face gear with a first tooth clearance, and a second cylindrical pinion whose axis of rotation is parallel to the axis of rotation of the first cylindrical pinion, which second pinion is in mesh with the second face gear with a second tooth clearance, while the input or the output shaft being connected to the first pinion, said gear transmission capable of transmitting a torque in both directions of rotation, wherein the toothings of the face gears and the pinions in mesh therewith are designed such that the first tooth clearance is greater than the second tooth clearance.

2. Gear transmission according to claim 1, wherein the second pinion is in mesh with the first cylindrical pinion with a third tooth clearance, and wherein the first tooth clearance is equal to the sum of the second and third tooth clearance.

3. Gear transmission according to claim 1, wherein the face gears, which are mounted at an adjustable distance from each other, are movable in the direction of the first axis of rotation.

4. Gear transmission according to claim 1, wherein the second pinion has a greater number of teeth than the first pinion.

5. Gear transmission according to claim 1, wherein the axis of rotation of the first pinion and the second pinion crosses the first axis of rotation.

6. Gear transmission according to claim 1, wherein the toothings of the first pinion and the first face gear in mesh therewith are designed in such a way by selection of number of teeth, pressure angle and tooth correction factor of the first pinion and diameters of the toothing of the face gear that a line of contact between the first face gear and the first pinion runs parallel to a line of contact between the first pinion and the second pinion, the direction of which depends upon the selection of the number of teeth, the pressure angle, the tooth correction factor and the center-to-center distance of the pinions.

7. Gear transmission according to claim 6, wherein the first pinion is designed with bearings which bound the movement of the first pinion solely in its axial direction, and the first pinion in the direction at a right angle to its axial direction is held in position by the tooth forces running in the direction of the lines of contact.

8. Gear transmission according to claim 1, wherein the face gears are mounted on a face gear shaft, and a third cylindrical pinion is mounted between the face gears on said face gear shaft, wherein the third pinion is in mesh with a gearwheel which is mounted on a shaft parallel to the face gear shaft, said shaft being both parallel to the face gear shaft, and selected from the group consisting of said output shaft and an additional shaft.

9. Gear transmission according to claim 8, wherein the third cylindrical pinion is provided with such toothing that the tooth forces produce no axial force on the face gear shaft.

10. Gear transmission according to claim 1, wherein the axis of rotation of either said first pinion or said second pinion crosses the first axis of rotation.

* * * * *